United States Patent [19]

Tada et al.

[11] Patent Number: 4,685,763

[45] Date of Patent: Aug. 11, 1987

[54] LIGHT MODULATION DEVICE

[75] Inventors: Kunio Tada, Urawa; Yoshikazu Nishiwaki; Shunji Matsuoka, both of Osaka, all of Japan

[73] Assignee: Sumitomo Electric Industries, Ltd., Osaka, Japan

[21] Appl. No.: 902,090

[22] Filed: Aug. 27, 1986

Related U.S. Application Data

[63] Continuation-in-part of Ser. No. 595,850, Apr. 2, 1984, abandoned.

[30] Foreign Application Priority Data

Mar. 31, 1983 [JP] Japan .................. 58-56947

[51] Int. Cl.⁴ .............................. G02B 6/12
[52] U.S. Cl. .................. 350/96.14; 350/96.11
[58] Field of Search ............... 350/96.11, 96.12, 96.13, 350/96.14

[56] References Cited

U.S. PATENT DOCUMENTS

| | | | |
|---|---|---|---|
| 3,976,358 | 8/1976 | Thompson | 350/96.13 |
| 4,082,419 | 4/1978 | Thompson et al. | 350/96.12 |
| 4,093,345 | 6/1978 | Logan et al. | 350/96.14 X |
| 4,185,256 | 1/1980 | Scifres et al. | 350/96.11 X |

FOREIGN PATENT DOCUMENTS

| | | | |
|---|---|---|---|
| 52-51955 | 4/1977 | Japan | 350/96.14 |
| 54-48569 | 4/1979 | Japan | 350/96.14 |
| 57-37327 | 3/1982 | Japan . | |

OTHER PUBLICATIONS

Reinhart, "Phase and Intensity Modulation Properties of . . . ", *Digest of Tech. Papers—Topical Mtg. on Integrated Optics*, OSA, Jan. 1974, pp. WA6-1 to WA6-6.
Kawaguchi, "GaAs Rib-Waveguide Directional-Coupler Switch with . . . ", *Electronics Lett.*, vol. 14, No. 13, Jun. 1978, pp. 387–388.
Carenco et al, "Multiwavelength GaAs Rib Waveguide Directional-Coupler Switch with . . . ", *J. Appl. Phys.*, vol. 50, No. 8, Aug. 1979, pp. 5139–5141.
Carenco et al, "GaAs Homojunction Rib Waveguide Directional Coupler Switch", *J. Appl. Phys.*, vol. 51, No. 3, Mar. 1980, pp. 1325–1327.

*Primary Examiner*—John Lee
*Attorney, Agent, or Firm*—Cushman, Darby & Cushman

[57] ABSTRACT

A light modulation device according to the present invention comprises a substrate, a substrate layer, an optical waveguide layer, and buffer layers, in the order from the bottom upward, all formed of either n-type or p-type compound semiconductor crystal. In this light modulation device, in order to capture the light in the optical waveguide layer, the composition ratio of the compound semiconductor is so determined that refractive index is at least approximately 0.1% higher in the optical waveguide layer than in the substrate layer and in the buffer layers. Further, the carrier density is low in the optical waveguide layer and in the buffer layers so that the applied voltage is applied mainly to the optical waveguide layer. Because of such construction, the light modulation device according to the present invention is free from strict conditions required in an etching process, is small in absorption loss of light, and can be used as a component of monolithic optical integrated circuit.

5 Claims, 6 Drawing Figures

LIGHT MODULATION DEVICE

This is a continuation-in-part of application Ser. No. 595,850, filed Apr. 2, 1984, which was abandoned upon the filing hereof.

BACKGROUND OF THE INVENTION

1. Field of the Art

The present invention relates to a light modulation device in which light is made to pass through two parallel optical waveguides made of a compound semiconductor to apply modulation voltages to the optical waveguides, thereby varying the intensity of the light.

2. Prior Art

When light is made to pass through optical waveguides disposed sufficiently adjacent and in parallel, light energy is exchanged between the optical waveguides due to the coupling between the optical waveguides. That is, as the light travels in the optical waveguides, a portion or all of the light energy in one of the waveguides transfers to the other of the optical waveguides. As the light travels farther, the light energy returns to the waveguide in which it was before. In this manner, the light energy moves reciprocally between the optical waveguides as the light travels therein.

In the case where the optical waveguides are made of a material having an electrooptical effect, when voltages are applied to the optical waveguides, refractive indices of the waveguides vary corresponding to the voltages applied. Then, since the coupling condition changes, the exchange of the light energy between the optical waveguides can be controlled by the applied voltages. The output light of a single optical waveguide varies corresponding to variation in the voltage applied thereto. Accordingly, a light modulation device can be constituted by applying voltages to optical waveguides coupled in parallel.

An example of the light modulation device of this kind is shown in FIG. 4.

A light modulation device generally designated 30 in FIG. 4 comprises a LiNbO$_3$ substrate 31 with two optical waveguides 32 and 33 having high refractive indices formed thereon by selective diffusion of titanium Ti. Electrodes 34 and 35 are formed on the optical waveguides 32 and 33, respectively. Modulation voltages 36 and 37 are applied to the electrodes 34 and 35, respectively, to reciprocally vary the refractive indices of the optical waveguides, respectively.

The two optical waveguides 32 and 33 are sufficiently adjacent to each other to allow exchange of light energy therebetween. The coupling condition between the optical waveguides varies corresponding to the modulation voltages to vary the intensity of the light passing therethrough.

However, the light modulation device 30 has the following disadvantages:

(a) Since the voltages are applied not only to the optical waveguides 32 and 33, it is necessary to apply sufficiently large voltages. Since there is no difference in resistivity between the LiNbO$_3$ substrate and the optical waveguides 32, 33 with Ti selectively diffused therein, the greatest portion of the voltages is applied to the LiNbO$_3$ substrate. The voltage required for modulation is preferably smaller.

(b) Since the electrodes 34, 35 are in contact with the optical waveguide 32, 33, loss of light by absorption is large there.

(c) Since the substrate is LiNbO$_3$ instead of a compound semiconductor, it is impossible to mount this light modulation device as well as other optical circuit components such as a light source, a light detector and the like on the same substrate. In other words, it cannot be used as a component of a monolithic optical integrated circuit.

The light modulation device described above is disclosed by, for example, an article by R. V. Schmidt and H. Kogelnik entitled "Electro-optically switched coupler with stepped $\Delta\beta$ reversal using Ti-diffused LiNbO$_3$ waveguides" in the Applied Physics Letters, Vol. 28, No. 9, 1 May 1976, pp. 503-506.

There has been proposed a light modulation device directed to be monolithic by using a compound semiconductor such as GaAs substrate. An example of publicly known light modulation device using GaAs substrate is shown in FIG. 5.

A light modulation device generally designated 40 in FIG. 5 comprises an n-type GaAs substrate 41 having an i-type GaAs layer 42 formed thereon and two parallel bar members 43, 44 of p-type GaAs formed on said i-type GaAs layer 42. Electrodes 45, 46 and 47 are provided on the substrate 41, and the bar members 43, 44, respectively.

The i-type GaAs layer (intrinsic semi-conductor) 42 having high resistance can capture light and function as an optical waveguide layer.

Further, since the p-type GaAs bar members 43, 44 are disposed on the i-type GaAs layer 42, regions 49, 50 directly under the bar members 43, 44, respectively, have equivalently high refractive indices. Since light is captured in the regions 49, 50, they function as optical waveguides.

The electrode 45 is grounded. A negative D.C. voltage is applied to the electrodes 46, 47, and further a modulation voltage is applied thereto. Since the p-n junction is reversally biased, no current is allowed to flow therebetween.

Since the optical waveguides 49, 50 are made of i-type GaAs having a low carrier density, the greater portion of the voltage is applied to the optical waveguides and little voltage is applied to the substrate 41 and the bar members 43, 44.

The light modulation device shown in FIG. 5 has advantages that it can be used as a component of a monolithic optical integrated circuit since it uses GaAs as substrate, and that since the regions 49, 50 functioning as optical waveguides are spaced from the electrodes 46, 47, there is very little loss of light by absorption by the electrode metal and the greater portion of the applied voltage is applied to the optical waveguide regions 49, 50.

On the other hand, however, the light modulation device shown in FIG. 5 has disadvantages described below.

The light modulation device 40 is produced by epitaxial growth of an i-type GaAs layer 42 and a p-type GaAs layer on an n-type GaAs wafer. Thereafter, the p-type GaAs layer is etched to leave two parallel square bar-shaped portions which should function as the bar members 43, 44.

Ideally, etching should be performed accurately to the boundary between the p-type and the i-type layers. In fact, however, since the p-type and the i-type are both of the same GaAs crystal and different only in impurity density, there is no substantial difference in etching rate therebetween. Accordingly, the p-type layer is etched, with the etching time constant, to the boundary between the p-type and the i-type layers to remove the portions other than the bar members 43, 44.

In case of over-etching, the i-layer is etched to remove the portion between the two optical waveguides 49, 50, thereby preventing generation of coupling of the waveguides. In case of under-etching so as not to remove the i-layer, a portion of the p-layer is left unetched on the i-layer. FIG. 6 is a sectional view of the light modulation device showing the state of under-etching described above.

In the under-etched light modulation device shown in FIG. 6, residual p-layers 51, 52, 53 are present adjacent to the p-type bar members 43, 44. Since a p-layer is of a lower specific resistance than an i-layer, the residual p-layers 51, 52, 53 are substantially equipotential to the bar members 43, 44. The voltage is applied widely between the p-layers and the n-type substrate 41, whereby it is no more possible to concentrate the applied voltage to the optical waveguide regions 49, 50 only.

The voltage of the D.C. component to inversely bias the p-n junction is supplied widely between the p-layers and the n-type substrate, and is applied to all over the i-layer.

The modulation voltages are, unlike the voltage of the D.C. component, applied to the electrodes of the p-type bar members in opposite polarities. These A.C. components are, however, short-circuited by the intermediate residual p-layer 52 having a low resistance. Accordingly, the modulation electric field hardly extends into the optical waveguide regions 49, 50 thereby prohibiting modulation.

As described above, the light modulation device shown in FIG. 5 is difficult to manufacture because its etching is very delicate in process.

The light modulation device described above is disclosed by, for example, an article by A. Carenco and L. Manigaux entitled "GaAs homojunction rib waveguide directional coupler switch" in the J. Appl. Phys. 51(3), March 1980, pp. 1325-1327.

The following properties are generally required for a light modulation device:

(a) Light can be captured in the optical waveguide layer; and (b) Most of the applied voltage is applied locally to the optical waveguide layer.

In the conventional light modulation device shown in FIG. 5, in order to capture the light, difference in carrier density is produced in the GaAs crystal to utilize the phenomenon that refractive index is higher in the portion lower in carrier density. For this reason, it has a p-i-n structure. That is, the condition (a) is accomplished by utilizing the difference in carrier density. The condition (b) is also related directly to specific resistance or carrier density of each of the layers. The i-layer (intrinsic semiconductor) has a higher specific resistance than any of the n- and the p-layers. In using the i-layer as the optical waveguide, this is not contradictory to the condition (b) because in the laminated structure of the p-i-n layers, when voltages are applied to the p-n junction in opposite directions, most of the voltage is applied to the i-layer.

In this known technique, the difference in carrier density is produced skillfully in the GaAs crystal to satisfy the conditions (a) and (b) at the same time.

However, since only one parameter, that is carrier density, is used to satisfy the two conditions, this known light modulation device has a disadvantage that the number of parameters is insufficient to provide satisfactory control.

The difficulty in the etching process described hereinabove is, after all, due to the insufficient number of parameters.

The inventors have found that the above-mentioned disadvantage can be overcome if the two conditions required for the optical waveguides of a light modulation device are satisfied independently from each other by operating separate parameters.

SUMMARY OF THE INVENTION

An object of the present invention is to provide a light modulation device which has limited loss of light by absorption and is adapted to be used as a monolithic optical integrated circuit.

Another object of the present invention is to provide a light modulation device which satisfies two conditions, namely the first condition that light can be captured in the optical waveguide layers and the second condition that most of the applied voltage is applied locally to the optical waveguide layers, and is free from severe conditions to be required for etching processes.

In order to accomplish the above-identified objects, in the present invention, a light modulation device is produced by forming a plurality of $Ga_{1-x}Al_xAs$ layers on a GaAs substrate considering that a GaAs single crystal and a $Ga_{1-x}Al_xAs$ single crystal are substantially identical to each other in crystal structure, lattice distance, thermal expansion and the like. In this case, since GaAs has a larger refractive index than $Ga_{1-x}Al_xAs$, light can be captured in GaAs by interposing GaAs between $Ga_{1-x}Al_xAs$ layers. This property has been utilized in double-heterostructure laser diodes and the like. Since the refractive index of $Ga_{1-x}Al_xAs$ decreases as the value x increases, composition ratios of the crystals are made different from each other to capture the light in the optical waveguides according to the present invention. That is, composition ratios of the crystals are utilized as parameters of the first condition to capture the light in the optical waveguide. On the other hand, the second condition that most of the applied voltage is applied locally to the optical waveguide resolves itself into a question of specific resistance of the crystal. That is, the optical waveguide requires to have a higher specific resistance than other layers. Accordingly, carrier density is used as the parameter of the second condition.

The light modulation device according to the present invention has no p-n junction but has a common type of carrier through all the layers. That is, all the layers of the light modulation device are formed either of n-type semiconductors or p-type semiconductors. Parameters determining the properties of these semiconductor layers are composition ratios of Ga, Al and carrier densities.

BRIEF DESCRIPTION OF THE DRAWINGS

The invention will be better understood from the following description taken in connection with the accompanying drawings in which.

DESCRIPTION OF THE PREFERRED EMBODIMENT

Figure 1:
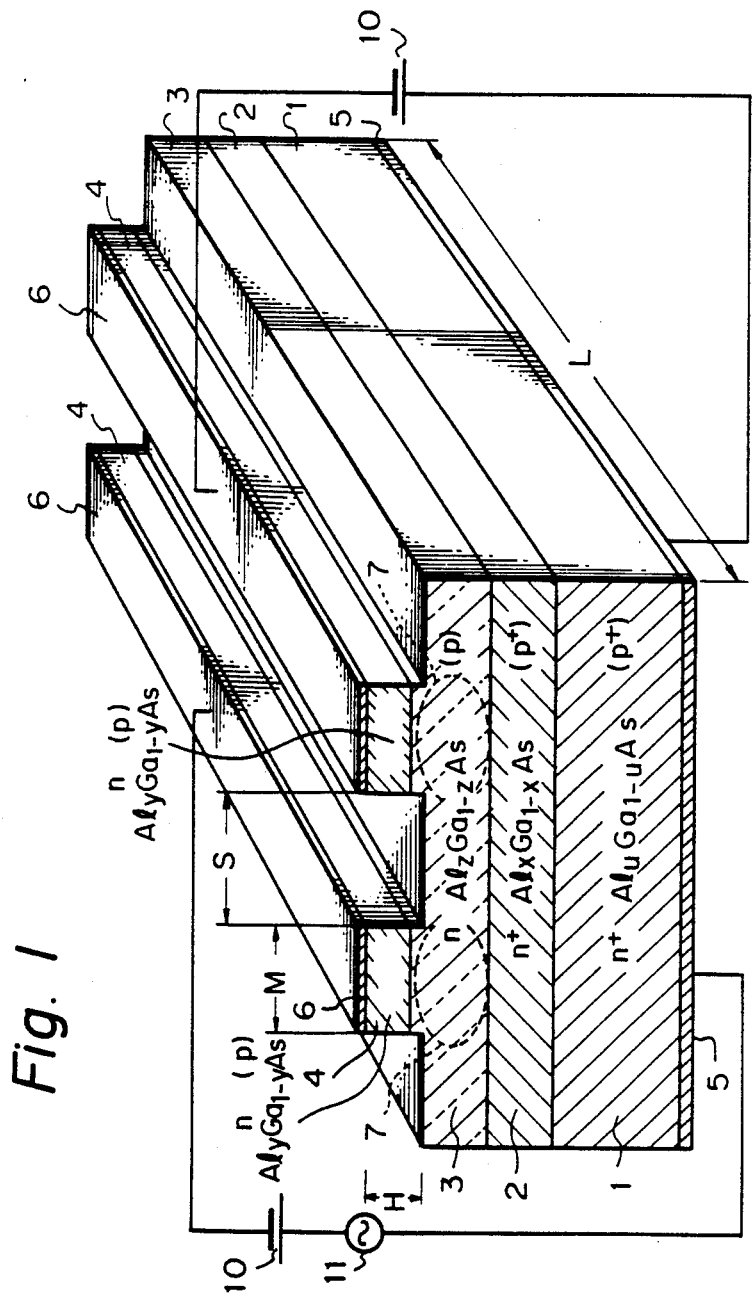
FIG. 1 is a perspective view of an embodiment of the light modulation device according to the present invention showing an end thereof in cross section.

With reference now to the drawings and more particularly to FIG. 1 thereof, there is illustrated an embodiment of the light modulation device according to the present invention, comprising, from bottom upward, an ohmic electrode 5, a substrate 1 of n$^+$(p$^+$) Al$_u$Ga$_{1-u}$As single crystal, a substrate layer 2 of n$^+$(p$^+$) Al$_x$Ga$_{1-x}$As single crystal, an optical waveguide layer 3 of n(p) Al$_z$Ga$_{1-z}$As single crystal, buffer layers 4 of n(p) Al$_y$Ga$_{1-y}$As single crystal and Schottky electrodes 6. The substrate layer 2 is formd by epitaxial growth on the substrate 1, the optical wave guide layer 3 is formed by epitaxial growth on the substrate layer 2 and the buffer layers 4 are formed by epitaxial growth on the optical wave layer 3.

In order to capture the light effectively, the optical waveguide layer 3 is required to be sufficiently, that is at least approximately 0.1%, higher in refractive index than the buffer layers 4 and the substrate layer 2 holding partially the layer 3 therebetween. This is equivalent so that z is made sufficiently smaller than any of x and y.

Because of the substrate layer 2, the composition ratio of the substrate 1 can be arbitrarily determined. Since GaAs wafers are readily obtainable, both of the substrate 1 and the optical waveguide 3 can be of GaAs. In such a case, if the Al ratios x and y of the substrate layer 2 and the buffer layers 4, respectively, are positive, the optical waveguide layer 3 can capture the light therein effectively.

The substrate layer 2 becomes necessary only when the Al ratio u of the substrate 1 cannot be higher than the Al ratio z of the optical waveguide layer 3.

In case the substrate 1 having the Al ratio u higher than the Al ratio z of the optical waveguide layer 3, the substrate layer 2 can be omitted.

The terms "n" and "p" denote n-type semiconductor and p-type semiconductor, respectively. The terms "n$^+$" and "p$^+$" denote portions at which carrier density is especially higher than n and p, respectively. The term "n(p)" means that any of n-type and p-type can be used but they cannot be mixed with each other, that is, it is required that all the layers are either of n-type (n$^+$-n$^+$-n-n) or of p-type (p$^+$-p$^+$-p-p).

Carrier density is high, preferably of the order of 10$^{17}$/cm$^3$, in the substrate layer 2 and in the substrate 1. On the other hand, in the buffer layers 4 carrier density is small, for example, of the order of 10$^{15}$/cm$^3$.

The optical waveguide layer 3 forms in the upper portions thereof a portion each of two adjacent parallel bar members. Two thin buffer layers 4 are provided on the bar members by epitaxial growth and etching parallel and sufficiently close to each other to ensure that evanescent wave coupling occurs.

In the planar optical waveguide layer 3, equivalent refractive index is high in waveguide regions 7, 7 directly under the buffer layers 4, whereby light is localized in the waveguide regions 7, 7.

The buffer layers 4 and the electrodes 6 mounted thereon are in Schottky contact with each other. In order that the electrodes 6 to be Schottky electrodes, the electrodes 6 are made of, for example, aluminum.

The electrode 5 attached to the substrate 1 is in ohmic contact therewith and is made of, for example, Au or Au-Ge alloy.

In opposition to the electrode 5 of the substrate 1, a negative bias voltage is applied to each of the Schottky electrodes 6 by a negative D.C. source 10. A source of modulation voltage 11 is provided to apply a modulation voltage to either one of the Schottky electrodes 6 as shown in FIG. 1, or two modulation voltage sources 11 opposite in polarity may be provided to apply modulation voltages to the Schottky electrodes 6 respectively.

Since the Al ratio z of the optical waveguide layer 3 is lower than any of the Al ratios of the buffer layers 4 and the substrate layer 2, the optical waveguide layer 3 has a higher refractive index than these layers adjacent thereto and is capable of capturing light therein effectively.

Since the waveguide regions 7, 7 through which light travels are connected with each other through the optical waveguide layer 3, there is coupling therebetween to exchange light energy therebetween.

Since the buffer layers 4 isolate light from the metal electrodes, loss of light due to absorption by the metal electrodes is reduced.

The light modulation device shown in FIG. 1 has no particular p-n junction. However, since the electrodes 6 are in Schottky contact with the buffer layers and a negative voltage is applied to the Schottky electrode 6, little current flows therethrough.

Modulation voltages are applied to the buffer layers 4, 4 having high specific resistivity and the optical waveguide layer 3. Particularly, most of the voltages are applied to the waveguide regions 7, 7 directly under the buffer layers 4, 4, respectively.

In the light modulation device according to the present invention, composition ratios of Al and Ga are made different by layers to capture light in the optical waveguide layer. In order that the applied voltages are applied mainly to the optical waveguide layer, the optical waveguide layer 3 and the buffer layers 4 are low in carrier density.

An excellent characteristic of the light modulation device according to the present invention is that no strict condition is required for an etching process of the buffer layers. It is not especially required that etching be performed to the boundaries between the optical waveguide layer 3 and the buffer layers 4 without any excess or deficiency.

Figure 2:
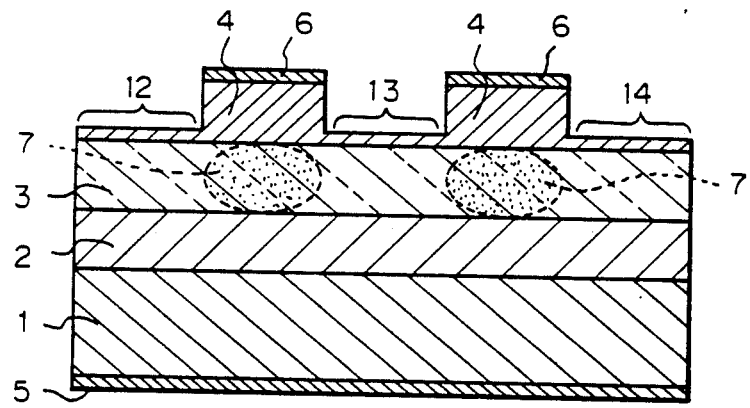
FIG. 2 is a cross-sectional view of the light modulation device showing the state in which under-etched buffer layers are remaining on the optical waveguide layer.
Figure 4:
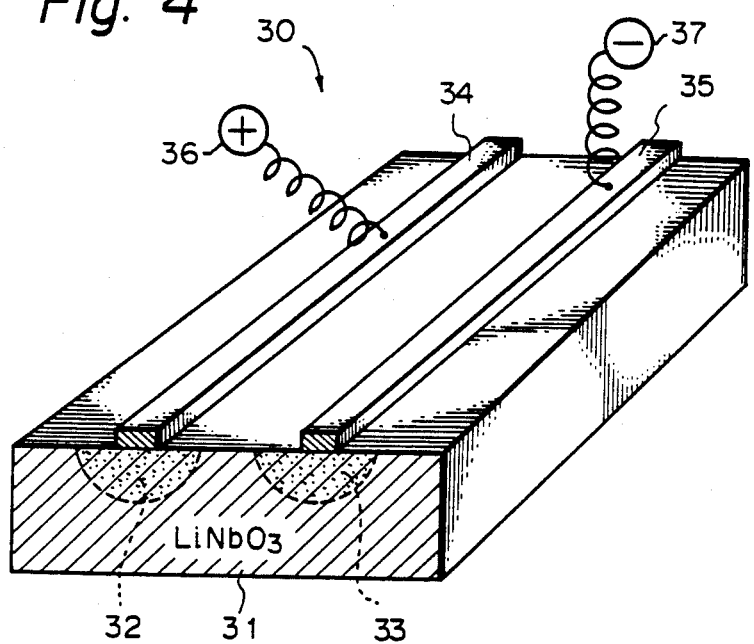
FIG. 4 is a perspective view of a conventional light modulation device produced by selectively diffusing Ti on a LiNbO$_3$ substrate, showing an end in cross section.

In case broad buffer layers remain due to under-etching as shown in FIG. 2 in section, when a voltage is applied between the electrodes, residual buffer layers 12, 13, 14 are not of the same potential as the buffer layers 4 of the waveguide regions because the buffer layers 4 are high in resistance, and, accordingly, a strong electric field is not applied to other portions than the waveguide regions 7 of the optical waveguide layer 3.

On the other hand, since the substrate layer 2 and the substrate 1 are low in resistance, little voltage is applied to these portions.

Figure 5:
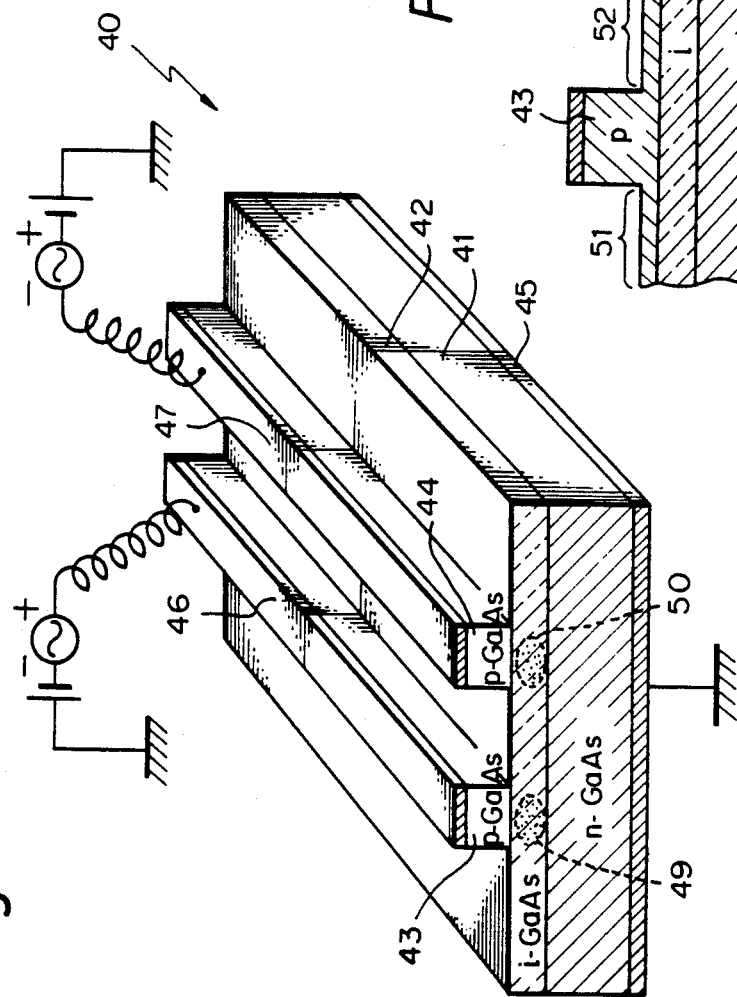
FIG. 5 is a perspective view of another conventional light modulation device made of a GaAs crystal having a p-i-n junction, showing an end in cross section; and, FIG. 6 is a cross-sectional view of the conventional light modulation device of FIG. 5, showing the state in which under-etched p-type layers are remaining widely on the i-type layer.

Further, the process of etching the buffer layers 4 is made easier in the present invention because of the absence of the requirement for accurate etching to remove the material from the buffer layers without any excess or deficiency. This is a characteristic of the light modulation device according to the present invention over that of the conventional device shown in FIG. 5.

The buffer layers 4 may be very small in thickness because they are for keeping light away from the electrodes.

Figure 3:
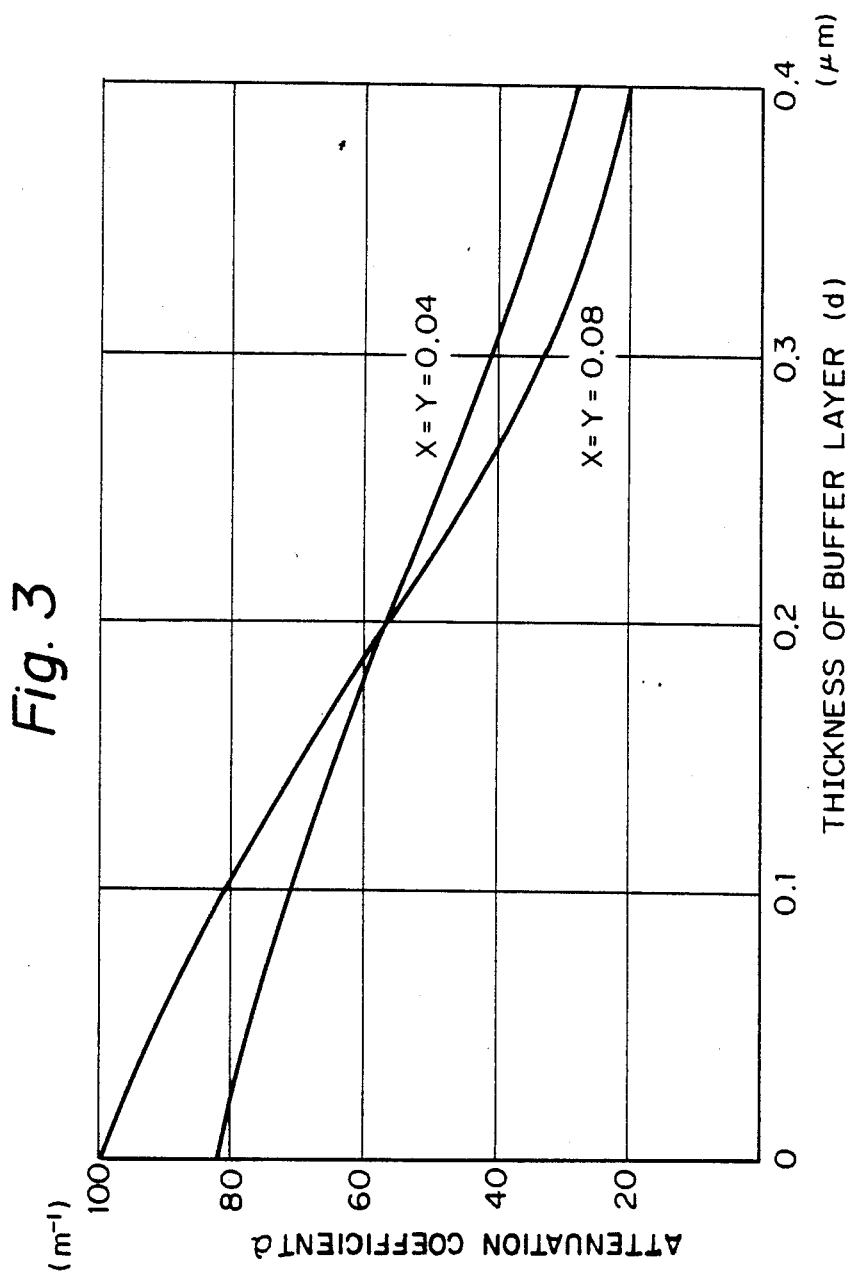
FIG. 3 is a graph showing the relationship between the thickness of the buffer layer and the loss of light due to absorption by the electrode, in which the horizontal axis denotes the thickness (μm) of the buffer layer and the vertical axis denotes the attenuation coefficient α (m$^{-1}$)
Figure 6:
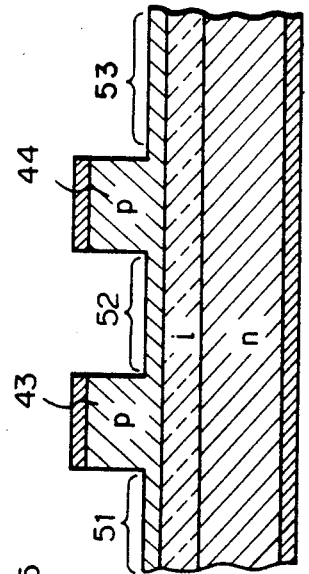

FIG. 3 shows variation of longitudinal attenuation coefficient $\alpha$ of light with the thickness d of the buffer layers varied. Al composition ratios y, x of the buffer layers and the substrate layer, respectively, are 0.04 or 0.08 The substrate and the optical waveguide layer are of GaAs ($u=z=0$). Wavelength of the light is 1.06 $\mu$m.

The attenuation coefficient $\alpha$ of the light denotes the degree of attenuation in the intensity of the light as the light passing through the optical waveguide propagates longitudinally (unit: $m^{-1}$). As seen from FIG. 3, the absorption loss of the light is sufficiently small when the thickness of the buffer layer is approximately 0.3 $\mu$m or more.

An example of the light modulation device according to the present invention comprises the following layers:

| Substrate | GaAs | |
|---|---|---|
| Substrate Layer | $Al_{0.04}Ga_{0.96}As$ | |
| Optical Waveguide Layer | GaAs | 1.5 $\mu$m thick |
| Buffer Layers | $Al_{0.04}Ga_{0.96}As$ | 0.4 $\mu$m thick |
| Distance S between Bar Members | | 4 $\mu$m |
| Width M of Bar member | | .4 $\mu$m |
| Height H of Bar member | | 0.5 $\mu$m |

That is, this is an example of the embodiment shown in FIG. 1 in which $x=y=0.04$, $u=z=0$, and length of the device L was 7.4 mm.

Electron density was $5 \times 10^{17} cm^{-3}$ in the substrate and the substrate layer, and $2 \times 10^{15} cm^{-3}$ in the buffer layer and the optical waveguide layer with specific resistance of $4 \times 10^{-3}$ $\Omega$cm and $6 \times 10^{-1}$ $\Omega$cm, respectively.

Thus, a light modulation device having switching voltage of 11 V, capacitance of 2.0 pF, modulation band $\Delta f$ of 3.2 GHz, and drive power per unit bandwidth ratio $P/\Delta f$ of 100 $\mu$W/MHz was obtained.

While the embodiments of the present invention have been described with respect to GaAs compound semiconductor, a device of similar construction can be produced with other compound semiconductors, such as InP and the like.

The light modulation device according to the present invention can be utilized in a single unit for external modulation of a light emitting device as a transmitting device in optical communication, and as a modulation device in an analogue waveform sampler, a laser printer, or an optical disc. It can be used also as one of the functional devices of another light modulation device.

While we have shown and described specific embodiments of our invention, it will be understood that these embodiments are merely for the purpose of illustration and description and that various other forms may be devised within the scope of our invention, as defined in the appended claims.

What is claimed is:

1. A light modulation device comprising:
   a substrate of a compound semiconductor crystal having a high carrier density;
   a substrate layer of a compound semiconductor single crystal having a high carrier density epitaxially grown on the substrate;
   an optical waveguide layer of a compound semiconductor single crystal having a low carrier density epitaxially grown on the substrate layer;
   two buffer layers of a compound semiconductor single crystal having a low carrier density epitaxially grown on the optical waveguide layer and formed by etching in parallel and sufficiently close to each other so that evanescent wave coupling occurs;
   an electrode in ohmic contact with the substrate; and electrodes in Schottky contact with the buffer layers respectively;
   wherein said substrate, substrate layer, optical waveguide layer, and buffer layers are all of either n-type or p-type semiconductor, and that said optical waveguide layer has a refractive index at least approximately 0.1% higher than any of those of the substrate layer and the buffer layers.

2. A light modulation device as set forth in claim 1, wherein said substrate is of $n^+Al_uGa_{1-u}As$, said substrate layer is of $n^+Al_xGa_{1-x}As$, said optical waveguide layer is of $nAl_zGa_{1-z}As$, and said buffer layers are of $nAl_yGa_{1-y}As$.

3. A light modulation device as set forth in claim 1, wherein said substrate is of $p^+Al_uGa_{1-u}As$, said substrate layer is of $p^+Al_xGa_{1-x}As$, said optical waveguide layer is of $pAl_zGa_{1-z}As$, and said buffer layers are of $pAl_yGa_{1-y}As$.

4. A light modulation device as set forth in claim 2 or claim 3, wherein the carrier density is approximately $10^{17}/cm^3$ in said substrate and in said substrate layer, and approximately $10^{15}/cm^3$ in said optical waveguide layer and in said buffer layers.

5. A light modulation device as set forth in claim 1, wherein said substrate, said substrate layer, said optical waveguide layer and said buffer layers are formed of an InP compound semiconductor crystal.

* * * * *